Patented Jan. 28, 1930

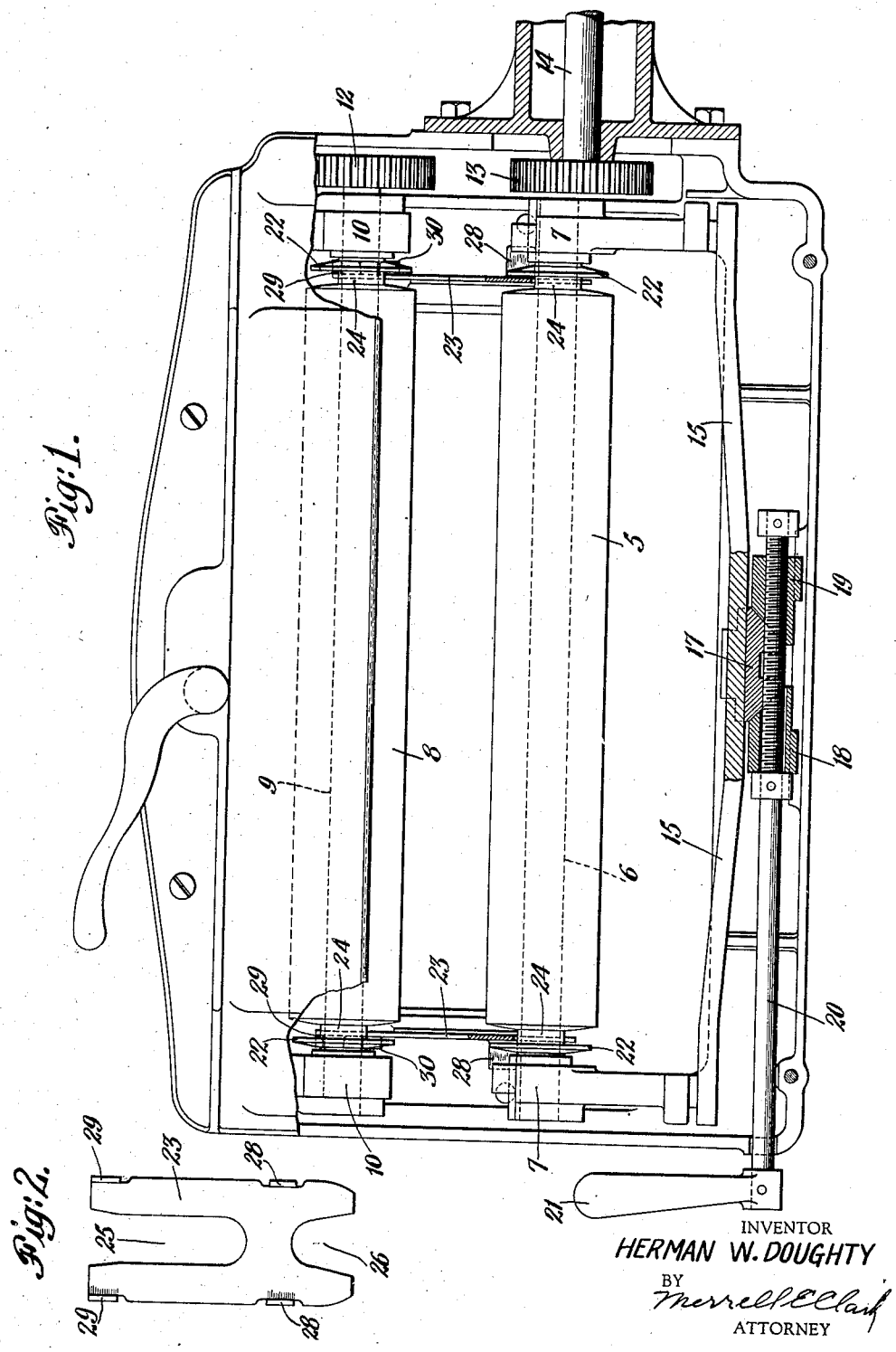

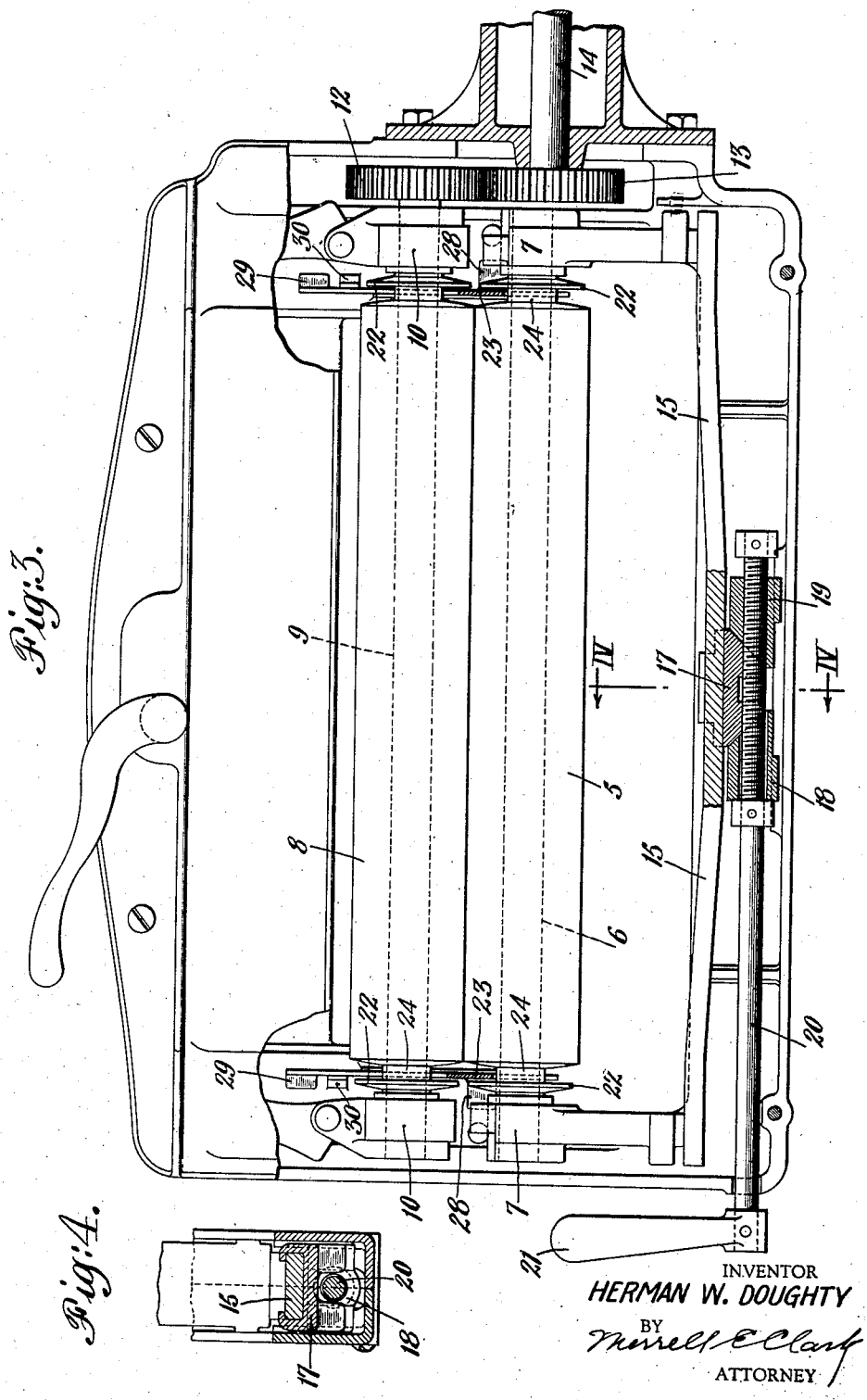

1,745,338

UNITED STATES PATENT OFFICE

HERMAN W. DOUGHTY, OF BINGHAMTON, NEW YORK, ASSIGNOR TO THE NINETEEN HUNDRED WASHER COMPANY, INC., OF BINGHAMTON, NEW YORK, A CORPORATION OF NEW YORK

WRINGER

Application filed February 28, 1928. Serial No. 257,589.

The present invention relates to wringers and has for an object to provide a wringer having improved means for adjusting the tension on the lower roll and improved means for protecting the bearings from the water squeezed out of the work when the wringer is in use. The operation of wringers is such that a considerable quantity of water flows from the ends of the rolls and some of it flows into the bearings causing corrosion and a washing of the products of corrosion into the tub to stain the work. The present invention provides a wedge mechanism for adjusting the tension on the lower roll and makes provision for shielding the bearings from the water while permitting relative movement of the rolls. A simple embodiment of the invention which can be economically an expeditiously manufactured is shown in the drawing forming a part hereof and in which—

Figure 1 is a view of a wringer with the invention applied thereto showing the rolls in separated relation, Figure 2 is a detail view of a shield or guard plate, Figure 3 shows the rolls pressed together, and Figure 4 is a detail sectional view taken on the line IV—IV of Fig. 3.

The drawing shows a wringer of usual construction comprising a lower roll 5, the shaft 6 of which is mounted in vertically movable bearings 7, and an upper roll 8, the shaft 9 of which is mounted in vertically movable bearings 10. The shaft 9 of the upper roll carries a gear 12 which, when the roll is in operative position, meshes with and is driven by a gear 13 on a driving shaft 14. The lower roll 5 is normally urged upwardly by a leaf spring 15, the tension of which may be adjusted by means of the cooperating wedge members 17, 18 and 19, of which the member 17 is secured to the spring and the members 18 and 19 are carried by a shaft 20 which passes through enlarged bores in the wedge members 17 and 18 and is threaded into the wedge member 19 whereby, when the shaft is rotated as by means of an arm 21, the relative movement of the wedges 18 and 19 will force the intermediate wedge member 17 upwardly to tension said spring 15.

In the construction shown, the bearings are shielded by discs 22 and plates 23 to prevent the water squeezed from the work by the rolls from flowing into the bearings. As shown, each disc 22 is formed integral with a sleeve or hub 24 which fits the roll shaft between the end of the roll and the bearing. The discs as shown do not overlap to completely shield the bearings but a space is left between the two cooperating discs which space is bridged by guard plates 23 having upper and lower slots 25 and 26 to receive the shafts of the upper and lower roll. The plate and its upper slot 25 are of sufficient length to accommodate the considerable movement of the upper roll. When the upper roll is in its lower, operative position the plates 23 cooperate with the discs 22 to deflect away from the bearings the water squeezed out by the rolls.

The plates 23 are formed toward their lower ends with projections or lugs 28 engageable with the lower roll bearings 7 to support the plates in suitably centered position between the roll shafts and discs when the rolls are in normal operative position, and with projections 29 engageable with corresponding lugs 30 on the wringer frame, the arrangement being such that during slight movements of the lower roll as it is forced downwardly by the thickness of the work, the plates will be carried by the lower roll bearings but upon greater movements the plates will be supported in fixed position relative to the wringer frame. The plates are thus sufficiently centered between the discs on the two shafts during the movements of the lower roll to accommodate work of different thicknesses.

The foregoing description of a particular embodiment is illustrative merely and is not intended as defining the limits of the invention.

I claim:

1. In a wringer the combination with a pair of rolls and bearings carrying said rolls and movable relatively toward and from each other of discs carried by said rolls adjacent said bearings, together with guard plates overlying said discs between said rolls and arranged to deflect water extruded by said rolls from said bearings.

2. In a wringer the combination with a pair of rolls and bearings carrying said rolls and movable relatively toward and from each other of discs carried by said rolls adjacent said bearings, together with guard plates overlying said discs between said rolls and arranged to deflect water extruded by said rolls from said bearings, and means for centering said guard plates during relative movement of the rolls.

3. In a wringer the combination with a pair of rolls and bearings carrying said rolls and movable relatively toward and from each other of discs carried by said rolls adjacent said bearings, together with guard plates overlying said discs between said rolls, said guard plates having supporting means engageable with the lower roll bearing and supporting means engageable with the wringer frame whereby said guard plates may be supported alternatively by the lower roll bearing or the wringer frame.

In testimony whereof, I have signed my name to this specification this 23rd day of February, 1928.

HERMAN W. DOUGHTY.